(12) United States Patent
Tselepis et al.

(10) Patent No.: US 11,525,264 B2
(45) Date of Patent: Dec. 13, 2022

(54) SILICONE MEMBRANES

(71) Applicant: Holcim Technology Ltd, Zug (CH)

(72) Inventors: Arthur J. Tselepis, Midland, MI (US); Hongzhang Han, Waukesha, WI (US)

(73) Assignee: Holcim Technology Ltd, Zug (CH)

( * ) Notice: Subject to any disclaimer, the term of this patent is extended or adjusted under 35 U.S.C. 154(b) by 0 days.

(21) Appl. No.: 16/571,338

(22) Filed: Sep. 16, 2019

(65) Prior Publication Data

US 2020/0011061 A1    Jan. 9, 2020

Related U.S. Application Data

(63) Continuation-in-part of application No. 15/650,632, filed on Jul. 14, 2017, now abandoned.

(60) Provisional application No. 62/363,081, filed on Jul. 15, 2016.

(51) Int. Cl.
| | |
|---|---|
| *E04D 5/06* | (2006.01) |
| *E04D 5/14* | (2006.01) |
| *B29C 43/24* | (2006.01) |
| *C08K 3/013* | (2018.01) |
| *C08K 5/00* | (2006.01) |
| *C08L 83/04* | (2006.01) |

(52) U.S. Cl.
CPC ............... *E04D 5/06* (2013.01); *B29C 43/24* (2013.01); *C08K 3/013* (2018.01); *C08K 5/0025* (2013.01); *C08L 83/04* (2013.01); *E04D 5/144* (2013.01); *E04D 5/148* (2013.01); *C08L 2203/16* (2013.01); *C08L 2205/025* (2013.01); *C08L 2312/00* (2013.01)

(58) Field of Classification Search
CPC ........... E04D 5/06; E04D 5/148; E04D 5/144; B29L 2031/108
See application file for complete search history.

(56) References Cited

U.S. PATENT DOCUMENTS

| | | | |
|---|---|---|---|
| 822,602 A * | 6/1906 | Cross | ...................... E04D 5/148 52/746.11 |
| 3,510,387 A | 5/1970 | Robb | |
| 4,293,616 A | 10/1981 | Smith et al. | |
| 4,472,470 A | 9/1984 | Modic | |
| 4,668,315 A * | 5/1987 | Brady | ..................... E04D 11/02 156/278 |
| 4,827,686 A | 5/1989 | Stamper et al. | |

(Continued)

FOREIGN PATENT DOCUMENTS

WO    2013156996 A1    10/2013

OTHER PUBLICATIONS

International Search Report and Written Opinion dated Oct. 9, 2017 for related PCT/US2017/042212.

*Primary Examiner* — Patrick J Maestri
(74) *Attorney, Agent, or Firm* — Renner, Kenner; Arthur M. Reginelli

(57) ABSTRACT

A method for covering a roof, the method comprising (i) providing first and second silicone membranes, where the membranes are in the form of rolls; (ii) unrolling the first and second silicone membranes over a roof surface; (iii) positioning first and second membranes adjacent to one another and overlapping and edge of the second over an adjacent edge of the first membrane to thereby form a lap; (iv) securing the first and second membranes to the roof surface; and (v) seaming the first membrane to the second membrane in the lap.

9 Claims, 1 Drawing Sheet

(56) References Cited

U.S. PATENT DOCUMENTS

| | | | |
|---|---|---|---|
| 5,071,143 | A | 12/1991 | Byerly et al. |
| 5,236,532 | A | 8/1993 | Taylor et al. |
| 6,004,645 | A * | 12/1999 | Hubbard ................. B32B 27/08 428/57 |
| 2004/0244315 | A1 | 12/2004 | Rust et al. |
| 2007/0010615 | A1 | 1/2007 | Cogen et al. |
| 2007/0193167 | A1 | 8/2007 | Bruce et al. |
| 2007/0194482 | A1 | 8/2007 | Douglas et al. |
| 2009/0137168 | A1 | 5/2009 | Peng |
| 2010/0063190 | A1 | 3/2010 | Bankwitz et al. |
| 2010/0076144 | A1 | 3/2010 | Moore et al. |
| 2011/0076462 | A1 * | 3/2011 | Jette ..................... H01L 31/048 428/193 |
| 2014/0137736 | A1 | 5/2014 | Ahn et al. |
| 2015/0000522 | A1 | 1/2015 | Ahn et al. |
| 2015/0009566 | A1 | 1/2015 | Iyer et al. |
| 2015/0073085 | A1 | 3/2015 | Eliyahu et al. |
| 2015/0076743 | A1 | 3/2015 | Douglas et al. |
| 2015/0231556 | A1 | 8/2015 | Ahn et al. |
| 2016/0312471 | A1 | 10/2016 | Hubbard et al. |
| 2017/0210849 | A1 | 7/2017 | Ahn et al. |
| 2018/0094439 | A1 | 4/2018 | Wang et al. |

* cited by examiner

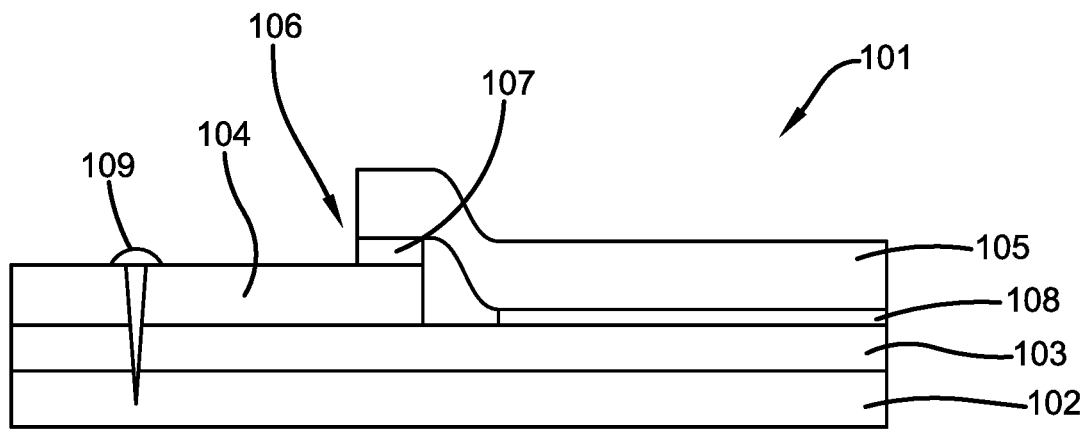

SILICONE MEMBRANES

CROSS-REFERENCE TO RELATED APPLICATIONS

This application is a continuation-in-part application of U.S. patent application Ser. No. 15/650,632, filed on Jul. 14, 2017, which claims the benefit of U.S. Provisional Patent Application No. 62/363,081, filed on Jul. 15, 2016, both of which are herein incorporated by reference in their entirety.

TECHNICAL FIELD

The present disclosure relates generally to silicone compositions and methods of using the compositions. More specifically, the present disclosure relates to silicone roofing membranes with improved durability.

BACKGROUND

Current materials used for single ply roof coverings or membranes include ethylene/propylene/butadiene (EPDM) copolymers, polyvinyl chloride (PVC)/plasticizer, and ethylene/propylene copolymer (TPO). Conventional single ply roof coverings or membranes have experienced several problems with longevity, UV and oxidative degradation, ease of installation, poor light reflectivity resulting in higher energy costs, shrinkage resulting in seam failure, time consuming attachment, replacement and repair procedures, low tolerance of cold temperatures causing cracking and loss of flexibility and lower adhesive resistance to chemical attack. There exists a need for improved membranes and methods of manufacturing membranes.

SUMMARY

In one aspect, disclosed are silicone membranes. In another aspect, disclosed are methods of preparing the silicone membranes. In another aspect, disclosed are methods of using the silicone membranes.

One or more embodiments of the present invention provide a method for covering a roof, the method comprising (i) providing first and second silicone membranes, where the membranes are in the form of rolls; (ii) unrolling the first and second silicone membranes over a roof surface; (iii) positioning first and second membranes adjacent to one another and overlapping and edge of the second over an adjacent edge of the first membrane to thereby form a lap; (iv) securing the first and second membranes to the roof surface; and (v) seaming the first membrane to the second membrane in the lap.

BRIEF DESCRIPTION OF THE DRAWINGS

FIG. 1 is a cross-sectional view of a roof system according to embodiments of the present invention.

DETAILED DESCRIPTION

Embodiments of the invention are directed toward factory-manufactured cured silicone membranes. These membranes may advantageously be used as membranes in construction of a roof system over a flat or low-sloped roof. According to embodiments of the invention, the membranes are formed by mechanically manipulating a polysiloxane-containing curable composition into an uncured membrane and then subsequently curing the membrane to form the silicone membranes of the invention. According to embodiments of the invention, the curable composition includes a silicone binder (e.g. silicone gum rubber), a plasticizer (e.g. low-molecular weight polysiloxane), a reinforcing filler, a curative agent, and a pigment. The membranes may further include other additives, such as those that provide dirt pick-up resistance.

The membranes can be used for a variety of exterior applications, such as roofing applications. For example, a roll of the silicone membrane may be the top part of a roofing system. Sheets of polyisocyanurate (polyiso) board can be mechanically fastened to a roof pan or to a previous roof, and then covered with a disclosed silicone membrane. The roll of silicone membrane may be unrolled over the polyiso board and overlapped (e.g., about 6 inches of overlap). The silicone membrane rolls may be glued down or mechanically fastened at the edges so the overlap covers the fasteners. An adhesive may then be applied under the overlap to permanently secure and seal the membranes to the polyiso board.

The cured silicone membranes can be used to extend the roofing season for silicone roofing, whereas current liquid applied systems are generally not applied below freezing temperatures due to cure rate and moisture concerns. The silicone membranes may possess greater longevity compared to known single ply systems, for example the membranes may have a 20-, 40-, or 50-year lifetime. The silicone membranes may maintain flexibility across the full range of seasonal temperatures. Consequently, use of the disclosed silicone membrane can result in lower maintenance or replacement costs over the membranes' lifetime. The silicone membranes may possess a lower carbon footprint by virtue of the availability of silicone material feed-streams. The silicone membranes may be resistant to UV-degradation, oxidation, and ozonolysis. The silicone membranes may be fire retardant without requiring addition of flame retardant additives. The silicone membranes can be provided in various colors, including reflective white, to accommodate the geographic location, sun exposure, and temperatures associated therewith. The membranes can sustain a high level of solar reflectivity relative to conventional roof membranes, thereby providing further savings via reduced energy consumption. The silicone membranes may exhibit self-cleaning properties.

Curable Composition

As indicated above, the cured silicone membranes are formed from a curable composition. The curable compositions may include a silicone binder, a polysiloxane plasticizer, a reinforcing filler, a curative agent, and a pigment. The compositions may further include, for example, one or more catalysts, solvents, or additives.

In one or more embodiments, the curable composition has a Mooney Viscosity (ML 1+4) @ 100° C. of greater than 10, in other embodiments greater than 15, in other embodiments greater than 20, and in other embodiments greater than 25. In these or other embodiments, the curable composition has a Mooney Viscosity (ML 1+4) @ 100° C. of less than 70, in other embodiments less than 50, in other embodiments less than 40, and in other embodiments greater than 30. In one or more embodiments, the curable composition has a Mooney Viscosity (ML 1+4) @ 100° C. of from about 10 to about 70, in other embodiments from about 15 to about 50, and in other embodiments from about 20 to about 40.

Silicone Binder

As indicated above, the curable compositions include a silicone binder, which may also be referred to as gum-based silicone rubber, a high-temperature vulcanizing silicone rubber, a high-consistency silicone rubber, or simply a silicone rubber. In one or more embodiments, the silicone rubber is a high-molecular weight polydialkylsiloxane, such as polydimethylsiloxanes, with terminal functional groups that allow the polymer to be crosslinked.

The silicon-bonded organic groups of the diorganopolysiloxane may independently be selected from hydrocarbon or halogenated hydrocarbon groups. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenylethyl; and halogenated alkyl groups having 1 to 20 carbon atoms, such as 3,3,3-trifluoropropyl and chloromethyl. Thus, diorganopolysiloxane can be a homopolymer, a copolymer or a terpolymer containing such organic groups.

In one or more embodiments, the silicone rubber includes a terminal hydroxyl groups (i.e. a siloxy group). In other embodiments, the silicone rubber includes a terminal vinyl group (i.e. vinyl silane).

Silicone rubbers useful in the practice of the invention include those available under the tradename Xiameter™, e.g. Xiameter RBG-0901 (Dow), KE™, e.g. KE-550 (ShinEtsu), and Elastosil™ (Wacker).

In one or more embodiments, the silicone rubber has a number-average molecular weight greater than 200, in other embodiments greater than 400, in other embodiments greater than 600, in other embodiments greater than 800, and in other embodiments greater than 1,000 kg/mol.

In one or more embodiments, the silicone rubber is characterized by a Mooney Viscosity Mooney Viscosity (ML 1+4) @ 100° C. of greater than 10, in other embodiments greater than 15, in other embodiments greater than 20, and in other embodiments greater than 25. In these or other embodiments, the silicone rubber has a Mooney Viscosity (ML 1+4) @ 100° C. of less than 70, in other embodiments less than 50, in other embodiments less than 40, and in other embodiments greater than 30. In one or more embodiments, the silicone rubber has a Mooney Viscosity (ML 1+4) @ 100° C. of from about 10 to about 70, in other embodiments from about 15 to about 50, and in other embodiments from about 20 to about 40.

In one or more embodiments, the silicone rubber is characterized by a Shore A Hardness of greater than 10, in other embodiments greater than 15, in other embodiments greater than 20, and in other embodiments greater than 25. In these or other embodiments, the silicone rubber has a Shore A Hardness of less than 70, in other embodiments less than 50, in other embodiments less than 40, and in other embodiments greater than 30. In one or more embodiments, the silicone rubber has a Shore A Hardness of from about 10 to about 70, in other embodiments from about 15 to about 50, and in other embodiments from about 20 to about 40.

Plasticizer

As indicated above, the curable compositions include a polysiloxane plasticizer. In one or more embodiments, the polysiloxane plasticizer may be a hydroxyl-terminated polysiloxane, in other embodiments a vinyl-terminated polysiloxane, or in other embodiments a trimethyl-terminated polysiloxane, or a combination thereof. In one or more embodiments, the hydroxyl-terminated polysiloxane and the vinyl-terminated polysiloxane may be referred to as reactive plasticizers.

In certain embodiments, the hydroxyl-terminated polysiloxane has formula:

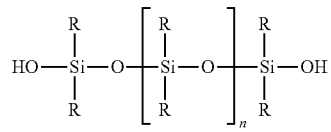

wherein R at each occurrence is independently selected from alkyl, alkenyl, alkynyl, aryl, arylalkyl, wherein said alkyl, alkenyl, aryl, and arylalkyl are each independently, at each occurrence, unsubstituted or substituted with one or more suitable substituents; and n ranges from 1 to 1,000. In certain embodiments, R is methyl at each occurrence.

In certain embodiments, the polysiloxane plasticizer is a hydroxyl-terminated polysiloxane having formula:

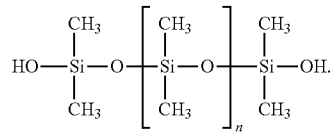

wherein n is 0, 1, 2, 3, 4, 5, 6, 7, or 8.

In one or more embodiments, the hydroxyl-terminated polysiloxane has a number average molecular weight of less than 100,000, in other embodiments less than 80,000, in other embodiments less than 60,000, in other embodiments less than 40,000, in other embodiments less than 20,000, in other embodiments less than 10,000, in other embodiments less than 5,000, in other embodiments less than 2,500, and in other embodiments less than 1,250 g/mol. In one or more embodiments, the hydroxyl-terminated polysiloxane has a number average molecular weight of from about 180 to about 100,000, in other embodiments from about 250 to about 20,000, and in other embodiments from about 500 to about 5,000 g/mole.

In one or more embodiments, the hydroxyl-terminated polysiloxane is characterized by a dynamic viscosity (e.g. Brookfield Viscosity) at 25° C. of less than 100,000 cP, in other embodiments less than 80,000 cP, in other embodiments less than 60,000 cP, in yet other embodiments less than 40,000 cP, and in yet other embodiments less than 20,000 cP. In one or more embodiments, the hydroxyl-terminated polysiloxane has a dynamic viscosity of from about 500 to about 100,000, in other embodiments from about 1,000 to about 75,000, and in other embodiments from about 5,000 to about 50,000 cP.

In one or more embodiments, the hydroxyl-terminated polysiloxane is characterized by a kinematic viscosity at 25° C. of less than 50,000, in other embodiments less than 25,000, in other embodiments less than 12,000, in yet other embodiments less than 6,000, and in yet other embodiments less than 3,000 cSt. In one or more embodiments, the hydroxyl-terminated polysiloxane has a kinematic viscosity of from about 100 to about 50,000, in other embodiments from about 250 to about 10,000, and in other embodiments from about 500 to about 2,500 cSt.

Exemplary hydroxyl-terminated components include, but are not limited to, Andisil® OH Polymers (e.g., Andisil®

OH 30 Low viscosity ~6% silanol fl, 30 cSt; Andisil® OH 40 Low viscosity 3.5% silanol fl, 40 cSt; Andisil® OH 70 Low viscosity 1.25% silanol fl, 70 cSt; Andisil® OH 750 Silanol terminated 750 cP; Andisil® OH 1,000 Silanol terminated 1,000 cP; Andisil® OH 2,000 Silanol terminated 2,000 cP; Andisil® OH 3,500 Silanol terminated 3,500 cP; Andisil® OH 4,000 Silanol terminated 4,000 cP; Andisil® OH 6,000 Silanol terminated 6,000 cP; Andisil® OH 14,000 Silanol terminated 14,000 cP; Andisil® OH 20,000 Silanol terminated 20,000 cP; Andisil® OH 50,000 Silanol terminated 50,000 cP; Andisil® OH 80,000 Silanol terminated 80,000 cP; and Andisil® OH 300,000 Silanol terminated 300,000 cP).

In certain embodiments, the polysiloxane plasticizer is a vinyl-terminated polysiloxane having formula:

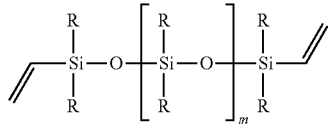

wherein R at each occurrence is independently selected from alkyl, alkenyl, alkynyl, aryl, arylalkyl, wherein said alkyl, alkenyl, aryl, and arylalkyl are each independently, at each occurrence, unsubstituted or substituted with one or more suitable substituents; and m ranges from 0 to 100. In certain embodiments, R is methyl at each occurrence.

In certain embodiments, the polysiloxane plasticizer is a vinyl-terminated polysiloxane having formula:

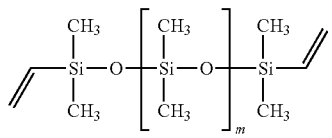

wherein m is 0, 1, 2, 3, 4, or 5.

In one or more embodiments, the vinyl-terminated polysiloxane has a number average molecular weight of less than 100,000, in other embodiments less than 80,000, in other embodiments less than 60,000, in other embodiments less than 40,000, in other embodiments less than 20,000, in other embodiments less than 10,000, in other embodiments less than 5,000, in other embodiments less than 2,500, and in other embodiments less than 1,250 g/mol. In one or more embodiments, the vinyl-terminated polysiloxane has a number average molecular weight of from about 180 to about 100,000, in other embodiments from about 250 to about 20,000, and in other embodiments from about 500 to about 5,000 g/mole.

In one or more embodiments, the vinyl-terminated polysiloxane is characterized by a dynamic viscosity (e.g. Brookfield Viscosity) at 25° C. of less than 100,000 cP, in other embodiments less than 80,000 cP, in other embodiments less than 60,000 cP, in yet other embodiments less than 40,000 cP, and in yet other embodiments less than 20,000 cP. In one or more embodiments, the vinyl-terminated polysiloxane has a dynamic viscosity of from about 500 to about 100,000, in other embodiments from about 1,000 to about 75,000, and in other embodiments from about 5,000 to about 50,000 cP.

In one or more embodiments, the vinyl-terminated polysiloxane is characterized by a kinematic viscosity at 25° C. of less than 50,000, in other embodiments less than 25,000, in other embodiments less than 12,000, in yet other embodiments less than 6,000, and in yet other embodiments less than 3,000 cSt. In one or more embodiments, the vinyl-terminated polysiloxane has a kinematic viscosity of from about 100 to about 50,000, in other embodiments from about 250 to about 10,000, and in other embodiments from about 500 to about 2,500 cSt.

Curative Agents

As indicated above, the curable compositions of the invention may include a curative, which may also be referred to as a curative agent or curing agent. In one or more embodiments, the curing agent is chosen as one suitable for reacting with and crosslinking the silicone material. Suitable curing agents include sulfur, sulfur donors, peroxides, phenolic curative, diamines, bismaleimides, and the like.

In certain embodiments, the curative agent includes an organic peroxide. Suitable organic peroxides are those which generate free radicals at the temperatures used in the curing (typically, temperatures of about 120° C. to about 200° C., or from about 140° C. to about 180° C.). Dialkyl peroxides or bis(dialkyl peroxides) which decompose at a temperature above 50° C. may be used. In certain embodiments, the peroxide is a di-tertiarybutyl peroxide having a tertiary carbon atom attached to the peroxy oxygen. Exemplary peroxides of this type are 2,5-dimethyl-2,5-di(tertiarybutylperoxy) hexyne-3 and 2,5-dimethyl-2,5-di(tertiarybutylperoxy)hexane. Other peroxides include, for example, dicumyl peroxide, dibenzoyl peroxide, tertiarybutyl perbenzoate, alpha, alpha'-bis(t-butylperoxy-diisopropylbenzene), and di[1,3-dimethyl-3-(t-butylperoxy)-butyl]carbonate. Peroxide curing agents are commercially available, for example, under the trade designations Perkadox, Luperco and Trigonox. The peroxide curing agents may be used in combination with one or more curing agents.

In certain other embodiments, the curative agent is a hydrosilation curing agent. The hydrosilation cure may be used in a crosslinking method. Exemplary hydrosilation curing agents include methylhydrogen polysiloxanes, methylhydrogen dimethyl-siloxane copolymers, alkyl methyl polysiloxanes, bis(dimethylsilyl)alkanes, and bis(dimethylsilyl)benzene. In certain embodiments, the hydrosilation curing agent has formula:

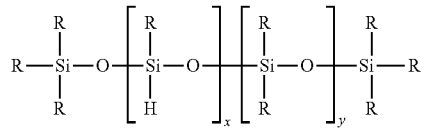

wherein R at each occurrence is independently selected from alkyl, alkenyl, alkynyl, aryl, arylalkyl, wherein said alkyl, alkenyl, aryl, and arylalkyl are each independently, at each occurrence, unsubstituted or substituted with one or more suitable substituents; x is 2, 3, 4, or 5 and y is 1, 2, 3, 4, or 5. In certain embodiments, R is methyl at each occurrence.

In certain embodiments, the hydrosilation curing agent has formula:

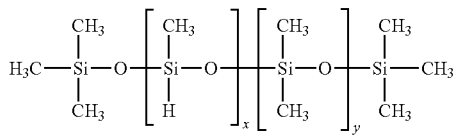

wherein x is 2, 3, 4, or 5; and y is 1, 2, 3, 4, or 5.

In certain embodiments, additives are often included that temporarily inhibit the hydrosilation reaction to permit operations such as mixing, while the composition is still readily flowable. The additives may include inhibitors, such as acetylenic alcohols, acetylenic glycols, cyclic methylvinylsiloxanes, alkynyl silanes, conjugated enynes, and maleate esters. In certain embodiments, the inhibitor is Surfynol® 61. The inhibitor may be included in the composition at, for example, 0 to 100 ppm or 8 to 50 ppm molar concentration.

Filler

In one or more embodiments, the curable compositions include a filler. In one or more embodiments, the filler may include a reinforcing filler. In one or more embodiments, the reinforcing filler may include an inorganic filler. In one or more embodiments, the reinforcing filler provides opacity, such as opacity to visible light, to the membranes of the present invention. Suitable fillers include, but are not limited to, calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, diatomaceous earth, calcium silicate, aluminum silicate, titanium oxide, aluminum oxide, zinc oxide, ferrite, iron oxide, carbon black, graphite, mica, clay, and bentonite. In certain embodiments, the filler is fumed silica. In certain embodiments the filler is carbon black.

Pigments

In one or more embodiments, the curable compositions of the present invention may include a pigment. In one or more embodiments, the pigment may be an organic pigment. In other embodiments, the pigment may include an inorganic pigments. In certain embodiments, both organic and inorganic pigments are included. The pigments may be UV absorbing, IR absorbing, UV reflective, or IR reflective. Pigment selection may allow the membrane to be UV opaque. Pigment selection may allow the membrane to be IR reflective. Pigment selection may be made to reduce heat infiltration and provide energy savings. Pigment selection may be made to allow heat infiltration and provide energy savings. Thus, pigment selection may be made to account for geographic location and climate. Suitable pigments include, but are not limited to, zinc oxide, antimony oxide, zirconium oxide, chromium oxide, iron oxide, lead oxide, zinc sulfide, titanium dioxide (anatase, rutile, or brookite), lithopone, and carbon black. In certain embodiments, the pigment is titanium dioxide. In certain embodiments, certain fillers may operate as both a reinforcing filler and a pigment.

Catalysts

In certain embodiments, one or more catalysts may be used to initiate or assist with the crosslinking reaction. Suitable catalysts include, but are not limited to, platinum catalysts. In certain embodiments, the platinum catalyst is a Karstedt catalyst. In certain embodiments, the platinum catalyst is Ashby's catalyst.

Surfactants

In one or more embodiments, the curable composition can include one or more surfactants. Suitable surfactants include, but are not limited to, an ethoxylated 3-hydroxypropylheptamethyltrisiloxane, an ethoxylated silicone polyether, a polyalkyleneoxide modified heptamethyltrisiloxane, a polydimethylsiloxane, a polyalkyleneoxide polysiloxane, and any combination thereof.

Suitable commercially available silicone surfactants may include, but are not limited to Dynol® 960 and Dynol® 980, available from Air Products and Chemicals, Inc. in Allentown, Pa. and Dow Corning® 67, Dow Corning® 500W, Dow Corning® 501W, and Dow Corning® 502W, available from Dow Corning in Midland, Mich. Combinations of these commercially available silicone surfactants may also be suitable for use in the embodiments described herein. In certain embodiments, the surfactant is 3-(polyoxyethylene) propylheptamethyltrisiloxane.

Flame Retardants

In one or more embodiments, the curable compositions of the present invention can include one or more flame retardants. In certain embodiments, the compositions do not contain flame retardants. Suitable flame retardants include, but are not limited to, phosphorus-containing flame retardants selected from the groups of the mono- and oligomeric phosphoric and phosphonic esters, phosphonate amines, phosphonates, phosphinates, metal dialkylphosphinates (e.g., aluminium tris[dialkylphosphinates] and zinc bis[dialkylphosphinates]), phosphites, hypophosphites, phosphine oxides, phosphazenes; and nitrogen-containing flame retardants individually or in a mixture, such as for example, melamine oxalate, melamine phosphate prim., melamine phosphate sec., and melamine pyrophosphate sec., reaction products of melamine with condensed phosphoric acids and reaction products of condensates of melamine with phosphoric acid or with condensed phosphoric acids, in particular melamine polyphosphate, and also the reaction products of melamine and polyphosphoric acid with basic aluminium compounds, with basic magnesium compounds and/or with basic zinc compounds, and also melamine cyanurate and amine neopentyl glycol borate; guanidine salts, such as guanidine carbonate, guanidine cyanurate prim., guanidine phosphate prim., guanidine phosphate sec., guanidine sulphate prim., guanidine sulphate sec., guanidine pentaerythrityl borate, guanidine neopentyl glycol borate, urea phosphate, and urea cyanurate. It is also possible to use condensates of melamine, in particular melem, melam, melon, or compounds of this type with higher level of condensation, and reaction products of these with condensed phosphoric acids; tris(hydroxyethyl) isocyanurate and reaction products thereof with carboxylic acids, benzoguanamine and its adducts and its salts, and its products substituted on nitrogen, and also adducts and salts of these. Other nitrogen-containing components that can be used are allantoin compounds, and salts of these with phosphoric acid, boric acid or pyrophosphoric acid, and also glycol urils and salts of these; and any combination of the foregoing. In certain embodiments, the flame retardant is selected from phosphate flame retardants, melamine flame retardants, tris (2-chloropropyl)phosphate (TCPP), tris (2-chloroethyl) phosphate (TCEP), tris(1,3-dichloroisopropyl) phosphate (TDCPP), dimethylmethylphosphonate (DMMP), and diethylene glycol (DEG) and propylene glycol (PG) esters of tetrabromophthalic anhydride (ME-TBPA), or any combination thereof. In certain embodiments, the disclosed compositions can include expanded graphite as a flame retardant. When crystalline flaky graphite is oxidized with concentrated sulfuric acid and a hydrogen peroxide solution, washed with water, and then put into a high-temperature expansion furnace, it is expanded in the direction of a c axis of graphite crystal. The crystalline flaky graphite expanded to 100-700% of initial volume thereof is referred to as "expanded graphite."

Additional Components

A variety of other ingredients may be included in the curable compositions. Exemplary additives include, but are not limited to, chain extenders, pigments, extenders, preservatives, antioxidants, reinforcing agents, antistatic agents, fillers and combinations of any of these.

In one or more embodiments, useful solvents or extenders include volatile silicones, polydimethylsiloxane (PDMS) oils, poly-phenylmethylsiloxane (PPMS) oils, isoparaffins, polyisobutylenes, methylene chloride, pentane, dodecane, tridecane, and mixtures thereof.

In one or more embodiments, the curable compositions may include a dirt pick-up resistance (self-cleanability) additive. Exemplary additives include polyalkylene oxide derivatives with terminal functional groups that can promote chemical bonding with the silicone membrane. For example, the additives may be polyethylene oxide (PEO), polypropylene oxide (PPO), or PEO-PPO block copolymers, with terminal functionalities selected from vinyl, allyl, acryloxy, methacryloxy, thiol, hydroxy, alkyl, alkoxysilyl, and silyl groups, and the like. In some embodiments, the polyalkylene oxide compounds may include about 5 to about 10 alkylene oxide units (e.g., about 6 to about 9 alkylene oxide units, such as ethylene oxide units). In some embodiments, higher molecular weight polyalkylene oxide derivatives may be suitable.

Other additives include ultraviolet absorbers. Suitable ultraviolet absorbers include, but are not limited to, aromatic propanedione UV absorbers (e.g., 4-t-Butyl-4'-methoxydibenzoylmethane or avobenzone, GIVSORB UV-14; and mixtures thereof); benzimidazole UV absorbers (e.g., 2-Phenyl-1H-benzimidazole-5-sulfonic acid, GIVSORB UV-16; and mixtures thereof); benzophenone UV absorbers (e.g., 2-Hydroxy-4-n-octyloxybenzophenone, UVINUL 3008; 2-Hydroxy-4-methoxybenzophenone, UVINUL 3040; 2-Hydroxy-4-methoxy-5-sulfobenzophenone or Sulisobenzone, UVINUL MS 40; 2-(4-Benzoyl-3-hydroxyphenoxy)-2-propenoic acid ethyl ester, CYASORB UV 2098; Homopolymer of 4-(2-Acryloyloxyethoxy)-2-hydroxybenzophenone, CYASORB UV 2126; 2,2'-Dihydroxy-4-methoxybenzophenone or Dioxybenzone, CYASORB UV 24; 2-Hydroxy-4-(2-hydroxy-3-decyloxypropoxy)benzophenone and 2-Hydroxy-4-(2-hydroxy-3-octyloxypropoxy) benzophenone, MARK 1535; 2,4,4'-Trihydroxybenzophenone, MAXGARD 200; 2-Hydroxy-4-(isooctyloxy) benzophenone, MAXGARD 800; 2-Hydroxy-4-dodecyloxybenzophenone, UVINUL 410; 2,2'-Dihydroxy-4,4'-dimethoxy-5,5'-disulfobenzophenone, disodium salt, UVINUL 3048; 2,4-Dihydroxybenzophenone or 4-Benzoylresorcinol, UVINUL 400; 2,2'-Dihydroxy-4,4'-dimethoxybenzophenone, UVINUL D 49; 2,2',4,4'-Tetrahydroxybenzophenone, UVINUL D 50; 2,2'-Dihydroxy-4-(2-hydroxyethoxy)benzophenone, UVINUL X-19; 2-Hydroxy-4benzyloxybenzophenone, Seesorb 105; and mixtures thereof); benzopyranone UV absorbers (e.g., 3,3',4',5,7-pentahydroxyflavone or quercetin; and mixtures thereof); benzotriazole UV absorbers (e.g., 2-[2-hydroxy-5-(1,1,3,3-tetramethylbutyl)phenyl]benzotriazole, TINUVIN 329; 2-(2'-hydroxy-5'-(2-hydroxyethyl))benzotriazole, NORBLOC 6000; 2-(2'-hydroxy-5'-methacrylyloxyethylphenyl)-2H-benzotriazole, NORBLOC 7966; 1,1,1-tris(hydroxyphenyl) ethane benzotriazole, THPE BZT; 5-t-butyl-3-(5-chloro-2H-benzotriazol-2-yl)-4-hydroxybenzenepropanoic acid octyl ester and 3-(5-chloro-2H-benzotriazol-2-yl)-5-t-butyl-4-hydroxybenzenepropanoic acid octyl ester, TINUVIN 109; a-[3-[3-(2H-benzotriazol-2-yl)-5-t-butyl-4-hydroxyphenyl]-1-oxopropyl]-w-hydroxypoly(oxy-1,2-ethanediyl) and a-[3-[3-(2H-benzotriazol-2-yl)-5-t-butyl-4-hydroxyphenyl]-1-oxopropyl]-w-[3-[3-(2H-benzotriazol-2-yl)-5-t-butyl-4-hydroxyphenyl]-1-oxopropox y]poly(oxy-1,2-ethanediyl), TINUVIN 1130; 2-(2-Hydroxy-3,5-di-t-butylphenyl)benzotriazole, TINUVIN 320; 2-(2-hydroxy-3-t-butyl-5-methylphenyl)-5-chloro-2H-benzotriazole, TINUVIN 326; 2-(3'-5'-di-t-butyl-2'-hydroxyphenyl)-5-chlorobenzotriazole, TINUVIN 327; 2-(2-Hydroxy-3,5-di-t-amylphenyl)benzotriazole, TINUVIN 328; 3-(2H-Benzotriazol-2-yl)-5-t-butyl-4-hydroxybenzenepropanoic acid, TINUVIN 384; 2-(2H-benzotriazol-2-yl)-4-methyl-6-dodecylphenol, TINUVIN 571; 3-(2H-benzotriazol-2-yl)-5-t-butyl-4-hydroxy-1,6-hexanediyl ester of benzenepropanoic acid and 3-(2H-benzotriazol-2-yl)-5-t-butyl-4-hydroxymethyl ester of benzenepropanoic acid, TINUVIN 840; 2-[2-hydroxy-3,5-bis-(1,1-dimethylbenzyl)phenyl]-2H-benzotriazole, TINUVIN 900; 2-(2H-benzotriazol-2-yl)-6-(1-methyl-1-phenylethyl)-4-(1,1,3,3-tetramethylbutyl)phenol, TINUVIN 928; 3-(2H-benzotriazol-2-yl)-5-t-butyl-4-hydroxybenzenepropanoic acid, C7-9 branched and linear alkyl esters, TINUVIN 99; 2-(2-hydroxy-5-methylphenyl) benzotriazole, TINUVIN P; 2-(2'-hydroxy-3'-sec-butyl-5'-t-butylphenyl)benzotriazole, TINUVIN 350; 2-(2'-hydroxy-5'-t-butylphenyl)benzotriazole, TINUVIN PS; bis[2-hydroxy-3-(2H-benzotriazol-2-yl)-5-octylphenyl]methane, TINUVIN 360; and mixtures thereof); benzoate UV absorbers (e.g., hexadecyl 3,5-di-t-butyl-4-hydroxybenzoate, CYASORB UV 2908; 3-hydroxyphenylbenzoate, SEESORB 300; ethyl-4-[[(ethylphenylamino)methylene]amino] benzoate, GIVSORB UV-1; Phenyl 2-hydroxybenzoate or phenylsalicylate, SEESORB 201; 2,4-di-t-butylphenyl-3,5-di-t-butyl-4-hydroxybenzoate, TINUVIN 120; 4-Bis(polyethoxy)amino acid polyethoxy ethyl ester, UVINUL P 25; 4-t-Butylphenyl 2-hydroxybenzoate or 4-t-butylphenylsalicylate, Seesorb 202; and mixtures thereof); benzoxazinone UV absorbers (e.g., 2,2'-(p-phenylene)di-3,1-benzoxazin-4-one, CYASORB 3638; and mixtures thereof); cinnamates or propenoate UV absorbers (e.g., dimethyl(p-methoxybenzylidene)malonate, SANDUVOR PR 25; 3-(4-methoxyphenyl)-2-propenoic acid 2-ethylhexyl ester or octyl p-methoxycinnamate, UVINUL 3039; and mixtures thereof); cyanoacrylate UV absorbers (e.g., ethyl-2-cyano-3,3-diphenylacrylate, UVINUL 3035; 2-ethylhexyl-2-cyano-3,3-diphenylacrylate, UVINUL 3039; 1,3-bis-[(2'-cyano-3,3'-diphenylacryloyl)oxy]-2,2-bis-{[(2-cyano-3,3-diphenylacryloyl)oxy]methyl}propane, UVINUL 3030; 2-Cyano-3-(2-methylindolinyl)methylacrylate, UV Absorber Bayer 340; and mixtures thereof); cycloaliphatic ketone UV absorbers (e.g., 3-(4-methylbenzylidene)-D,L-camphor, GIVSORB UV-15; and mixtures thereof); formamidine UV absorbers (e.g., Ethyl-4-[[(methylphenylamino) methylene]amino]benzoate, GIVSORB UV-2; and mixtures thereof); formanilide (including oxamide) UV absorbers (e.g., N-(2-ethoxyphenyl)-N'-(4-isododecylphenyl)oxamide, SANDUVOR 3206; N-[5-t-Butyl-2-ethoxyphenyl]-N'-(2-ethylphenyl)oxamide, TINUVIN 315; N-(2-ethoxyphenyl)-N'-(2-ethylphenyl)oxamide, TINUVIN 312; 2H-benzimidazole-2-carboxylic acid (4-ethoxyphenyl) amide, UVINUL FK 4105; and mixtures thereof); triazine UV absorbers (e.g., 2-[4,6-bis(2,4-dimethylphenyl)-1,3,5- triazin-2-yl]-5-octyloxyphenol, CYASORB UV 1164; confidential triazine derivative, TINUVIN 1545; 2-(4,6-diphenyl-1,3,5-triazin-2-yl)-5-hexyloxyphenol, TINUVIN 1577 FF; 2-[4-((2-Hydroxy-3-dodecyloxypropyl)oxy)-2-hydroxyphenyl]-4,6-bis(2,4-dimethylphenyl)-1,3,5-triazine, TINUVIN 400; 2,4,6-Trianilino-p-(carbo-2'-ethylhexyl-1'-oxy)-1,3,5-triazine, UVINUL T-150; and mixtures thereof); and salicylate UV absorbers (e.g., 3,3,5-trimethylcyclohexylsalicylate or homomenthyl salicylate, NEO HELIOPAN HMS; menthyl-o-aminobenzoate, NEO HELIOPAN MA; and mixtures thereof).

The TINUVIN compounds are commercially available from Ciba Specialty Chemicals Corporation of Tarrytown, N.Y.; UVINULS are commercially available from BASF Corporation of Charlotte, N.C.; CYASORBS are commercially available from Cytec Industries Inc. of West Paterson, N.J.; SANDUVORS are commercially available from Clariant Corporation of Charlotte, N.C.; NORBLOCS are commercially available from Janssen Pharmaceutical of Titusville, N.J.; Quercetin is commercially available from ACROS Organics of Pittsburgh, Pa.; MAXGARDS are commercially available from Garrison Industries of El Dorado, Ark.; SEESORBS are commercially available from Shipro Kasei of Osaka, Japan; MARK compounds are commercially available from Witco Chemical of Oakland, N.J.; GIVSORBS are commercially available from Givauden-Roure Corp. of Geneva, Switzerland; and NEO HELIOPANS are commercially available from Haarmann & Reimer of Teterboro, N.J.

In certain embodiments, the UV-absorber is Tinuvin® 1130, a benzotriazole based organic UV light absorber available from BASF, Florham Park, N.J.

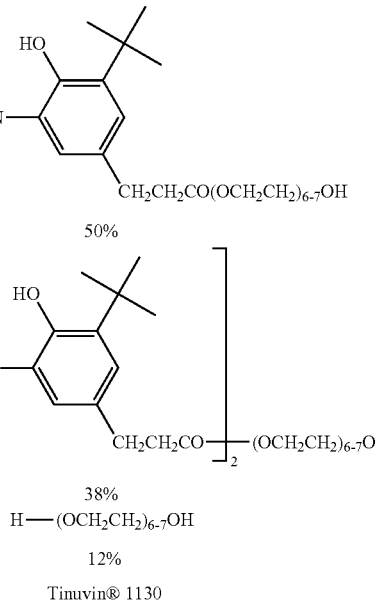

Tinuvin® 1130

Ingredient Amounts

In one or more embodiments, the curable compositions of the present invention may be described with reference to the matrix-forming polymers, which are the silicon rubber and the reactive plasticizers, as well any other ingredients of the curable composition that react with the silicone rubber or reactive plasticizers during the crosslinking reaction.

In one or more embodiments, the curable compositions include greater than 60, in other embodiments greater than 65, in other embodiments greater than 70, in other embodiments greater than 75, in other embodiments greater than 80, in other embodiments greater than 85, in other embodiments greater than 90, in other embodiments greater than 92, in other embodiments greater than 95, in other embodiments greater than 97 wt % of the matrix-forming polymers.

In one or more embodiments, the matrix-forming polymers include greater than 70, in other embodiments greater than 75, in other embodiments greater than 80, in other embodiments greater than 85, in other embodiments greater than 90 in other embodiments greater than 92, in other embodiments greater than 95, and in other embodiments greater than 97 wt % of the silicone rubber based on the total weight of the silicone rubber and the reactive plasticizer (i.e. the matrix-forming polymers). In one or more embodiments, the matrix-forming polymers includes from about 70 to about 100 wt %, in other embodiments from about 75 to about 97 wt %, in other embodiments from about 80 to about 95 wt % of the silicone rubber based on the total weight of matrix-forming polymers.

In one or more embodiments, the matrix-forming polymers include greater than 1, in other embodiments greater than 3, in other embodiments greater than 5, in other embodiments greater than 8, in other embodiments greater than 10, in other embodiments greater than 15, in other embodiments greater than 20, and in other embodiments greater than 25 wt % of the reactive plasticizer (i.e. the hydroxyl-terminated or vinyl-terminated) based on the total weight of the silicone rubber and the reactive plasticizer (i.e. the matrix-forming polymers). In one or more embodiments, the matrix-forming polymers include less than 30, in other embodiments less than 25, in other embodiments greater than 20, in other embodiments greater than 15, in other embodiments greater than 10, in other embodiments greater than 8, in other embodiments greater than 5, and in other embodiments greater than 3 wt % of the reactive plasticizer (i.e. the hydroxyl-terminated or vinyl-terminated) based on the total weight of the silicone rubber and the reactive plasticizer (i.e. the matrix-forming polymers). In one or more embodiments, the matrix-forming polymers includes from about 0 to about 30 wt %, in other embodiments from about 1 to about 25 wt %, in other embodiments from about 3 to about 20 wt % of the reactive plasticizer based on the total weight of matrix-forming polymers.

In one or more embodiments, the amount of reactive plasticizer within the curable composition is that amount sufficient to achieve a desired Mooney Viscosity of the curable composition. Desired Mooney Viscosities for the curable compositions are set forth above.

In one or more embodiments, where the curative is a peroxide-based curative agent, the curable compositions may include from about 1 to about 8 parts by weight of the peroxide-based curative, based on 100 parts by weight of the matrix-forming polymer mixture.

In one or more embodiments, where the curative is a hydrosilation curative agent, the curable compositions may include from about 1 to about 8 parts by weight of the hydrosilation curative, based on 100 parts by weight of the matrix-forming polymer mixture.

In one or more embodiments, the curable compositions may include from about 0.5 to about 100 parts by weight, or in other embodiments from 5 to 50 parts by weight, or in other embodiments from 20 to 35 parts by weight filler, based on 100 parts by weight of the matrix-forming polymer mixture.

In one or more embodiments, the curable compositions may include from about 0.5 to about 30 parts by weight, or in other embodiments from about 1 to about 25 parts by weight, or in other embodiments from about 5 to about 7 parts by weight pigment, based on 100 parts by weight of the matrix-forming polymer mixture.

In one or more embodiments, the curable compositions may include from about 0.1 to about 3 parts by weight, or in other embodiments from about 0.2 to about 1 parts by weight, or in other embodiments from about 0.3 to about 0.7 parts by weight catalyst, based on 100 parts by weight of the matrix-forming polymer mixture. In one or more embodiments, the curable composition is devoid or substantially devoid of catalyst.

In one or more embodiments, the curable compositions may include from about 0.1 to about 10 parts by weight, or in other embodiments from about 0.5 to about 5 parts by weight, or in other embodiments from about 1 to about 3 parts by weight surfactant, based on 100 parts by weight of the matrix-forming polymer mixture. In one or more embodiments, the curable composition is devoid or substantially devoid of surfactant.

In one or more embodiments, the curable compositions may include from about 0.1 to about 20 parts by weight, or in other embodiments from about 0.5 to about 10 parts by weight, or in other embodiments from about 1 to about 5 parts by weight flame retardant, based on 100 parts by weight of the matrix-forming polymer mixture. In one or more embodiments, the curable composition is devoid or substantially devoid of flame retardant (excluding the reinforcing filler or pigments).

In one or more embodiments, the curable compositions may include from about 0.1 to about 10 parts by weight, or in other embodiments from about 0.5 to about 5 parts by weight, or in other embodiments from about 1 to about 3 parts by weight antidegradant (e.g. UV absorber), based on 100 parts by weight of the matrix-forming polymer mixture. In one or more embodiments, the curable composition is devoid or substantially devoid of antidegradant.

In one or more embodiments, the curable compositions of this invention are devoid or substantially devoid of cured or curable hydrocarbon polymers. According the present specification, cured or curable hydrocarbon polymers include olefinic polymer including natural rubber and synthetic polymers such as those prepared by the polymerization of alpha-olefins, diolefins such as conjugated and non-conjugated dienes, and functionalized olefins such as acrylonitrile. As those skilled in the art appreciate, hydrocarbon polymers primarily comprise carbon-carbon bonds in the backbone of the polymer. As is also widely understood, hydrocarbon polymers can be cured by crosslinking of the hydrocarbon chains to produce thermoset hydrocarbon polymer networks. In one or more embodiments, the curable compositions include less than 10 wt %, in other embodiments less than 7 wt %, in other embodiments less than 5 wt %; in other embodiments less than 3 wt %, in other embodiments less than 2 wt %, and in other embodiments less than 1 wt % of a cured or curable hydrocarbon polymer.

Method of Making Silicone Membranes

The curable compositions can be prepared by mixing the various ingredients. A variety of mixing sequences can be employed. In certain embodiments, the silicone binder and the plasticizer may be added to a mixer, along with a reinforcing filler, a pigment, and a curative agent. In certain embodiments the mixer is a Kneader-style mixer. In certain embodiments, the mixer is a Baker-Perkins mixer. The curable composition may be mixed, for example, for about 30 minutes to about 1 hour. The curable composition may be heated (e.g., to about 120° C.) to reduce the viscosity. In certain embodiments, the mixing step is a semi-batch process.

In one or more embodiments, a two-stage mix sequence is employed. For example, the ingredients, absent the curative, are first mixed, at a first temperature, and then the curative is added and a mixing is continued at a second temperature.

In one or more embodiments, the curable composition can be fabricated into a uncured membrane by using a variety of techniques. For example, the membrane may be formed by adding the curable composition to an extrusion assembly. In certain embodiments, the extruder assembly may include a hollow cylindrical chamber and a hopper connected to a chamber. The chamber may include an outlet port at a lower end thereof, and a fluid inlet port. The hopper may have an input port configured to receive input material therethrough. A piston drive shaft having a piston attached at one end may be rotatable about a drive shaft axis that is coaxial with the cylindrical chamber. The piston may have one or more mixer blades coupled thereto and rotatable therewith. The piston may be controllably rotated about the drive shaft axis, after input material received through the input port of the hopper is delivered into the chamber, causing the mixer blades to rotate and mix the input material with the silicone mixture and the curative introduced through the fluid inlet port of the chamber. The piston may also be slidably movable from an upper end of the chamber toward the outlet port of the chamber, so that the mixed input material is extruded through the output port of the chamber. In certain embodiments, the silicone membrane is formed using a two-roll mill or a three-mill. In certain embodiments, silicone membrane is formed in a semi-continuous process or a fully continuous process.

The silicone membrane may be pressed into a desired thickness using a calendar roll assembly. The calendar process may include a continuous process whereby a film or sheet is passed through a calendar or roll assembly to form a film or sheet of substantially uniform thickness. In certain embodiments, a reinforcing scrim is added to the silicone membrane. Suitable scrim materials may include, but are not limited to, polypropylene or polyethylene terephthalate (PET), although of course other materials may be used. The calendar process may be performed as described in "as described in *Fabricating with Silastic High Consistency Silicone Rubber*, Dow Corning Corporation (2001), Midland, Mich. (accessible at https://www.dowcorning.com/content/publishedlit/45-0111_Silastic-HCR-Manual.pdf).

The silicone membrane may be cured by heating the silicone membrane in an oven. The silicone membrane may be heated, for example, from about 5 to about 7 minutes. The temperature of the oven may depend on the type of curative agent used. In certain embodiments, wherein the curative agent is a peroxide cure, the oven is heated to a temperature of about 140° C. to about 160° C. In certain embodiments, wherein the curative agent is a hydrosilation cure, the oven is heated to a temperature ranging from about 100° C. to about 120° C.

Once cured, the silicone membranes are then rolled such that the membranes can be easily transported to a job-site and unrolled.

Silicone Membrane Characteristics

The cured silicone compositions or membranes of the present invention have one or more advantageous properties.

In one or more embodiments, cured silicone compositions of the present invention may have a tensile strength of 100 psi to 2,000 psi, 100 psi to 400 psi, or 200 psi to 400 psi, as measured according to ASTM D412. The cured silicone compositions may have a tensile strength of about 100 psi, about 150 psi, about 200 psi, about 250 psi, about 300 psi, about 350 psi, about 400 psi, about 450 psi, or about 500 psi, as measured according to ASTM D412.

The cured silicone compositions may have an elongation at break of 50% to 400% or 50% to 200%, as measured according to ASTM D412. The cured silicone compositions may have an elongation at break of 50% or greater, 100% or greater, 150% or greater, 200% or greater, 250% or greater, 300% or greater, 350% or greater, or 400% or greater, as measured according to ASTM D412.

Reflectivity can be measured using a StellarNet Miniature Spectrometer, for example. The cured silicone membranes may have a reflectivity of 13% or greater, 14% or greater, 15% or greater, 16% or greater, 17% or greater, 18% or greater, 19% or greater, 20% or greater, 21% or greater, 22% or greater, 23% or greater, 24% or greater, 25% or greater, 26% or greater, 27% or greater, or 28% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 380 nanometers.

The cured silicone membranes may have a reflectivity of 75% or greater, 76% or greater, 77% or greater, 78% or greater, 79% or greater, 80% or greater, 81% or greater, 82% or greater, 83% or greater, 84% or greater, 85% or greater, 86% or greater, 87% or greater, 88% or greater, 89% or greater, or 90% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 500 nanometers.

The cured silicone membranes may have a reflectivity of 80% or greater, 81% or greater, 82% or greater, 83% or greater, 84% or greater, 85% or greater, 86% or greater, 87% or greater, 88% or greater, 89% or greater, 90% or greater, 91% or greater, 92% or greater, 93% or greater, 94% or greater, or 95% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 650 nanometers.

In some embodiments, particularly when additives are included in the silicone membranes that may increase the dirt pick-up resistance (self-cleanability), such as the polyalkylene oxide derivatives and/or UV absorbers described above, the silicone roof membranes may exhibit improved dirt pick-up resistance or cleanability relative to conventional silicone formulations. Without wishing to be bound by theory, the dirt pick-up resistance or self-cleanability may occur through one or more mechanisms. For example, the surface energy of a silicone elastomer is in the range of about 20-24 dynes/cm. The relatively low surface energy can cause water to bead up on top of the silicone roof. It may take a longer time for the beaded water to dry, which may lead to the accumulation of airborne dirt. Polyalkylene oxides possess higher surface energy than silicone elastomers, e.g., in the range of about 40-45 dynes/cm. Added polyalkylene oxide in the silicone matrix may phase separate and migrate to the surface of the silicone membrane during compounding and processing. The addition of polyalkyelene oxide may therefore serve as a convenient and robust way for surface modification of the silicone roof, which may provide a protective layer with increased the surface tension. The water on top of the polyalkylene oxide covered silicone can wet the surface more easily which shows a greater tendency to sheet water off the surface of coating. If water dries from the surface more quickly, it may reduce the time in which water can attract airborne dirt. A protective layer of polyalkylene oxide can also prevent dirt from bonding chemically with reactive moieties from the additives, fillers, or the silicone resin. The build-up static charge may also be reduced at the surface of the membrane, which may reduce the attraction of the environmental dirt.

The cured silicone membranes of the present invention may have a thickness of 20 mils to 150 mils, or 30 mils to 125 mils. The finished membranes may be cut to any dimensions as suitable for their intended use or customer.

Methods of Using Silicone Membranes

The disclosed membranes can be used in a variety of exterior applications. In certain embodiments, the membrane is used as a roofing membrane. As the sheet is unrolled over the roof substructure in an otherwise conventional fashion, the seams of adjacent sheet layers are overlapped.

The silicone membranes can be applied to a roof surface by using standard adhesive techniques. For example, the membrane can be unrolled on a roof surface and placed into position. Portions of the membrane are then typically folded back and portions of the release liner are removed. The membrane can then subsequently be adhered to the roof surface by using various techniques including the use of rollers and the like to mate the adhesive to the roof.

Additionally, where multiple membrane panels are employed, the membrane panels can be seamed to one another by over lapping the edges of the panels and fastening the edges of the panels so that the overlap covers a fastener. In certain embodiments, the top surface of the adjoining membrane can be primed prior to seaming the membranes to one another. The overlapping areas may be adhesively seamed to seal and secure the membranes. The width of the seam can vary depending on the requirements specified by the architect, building contractor or roofing contractor.

FIG. 1 shows a roof system 101 in which a first silicone membrane 104 and a second silicone membrane 105 have been unrolled and positioned over a roof surface 102. On top of the roof surface 102 is also shown an optional insulation panel 103 secured to the roof surface 102. The first silicone membrane 104 has been positioned adjacent the second silicone membrane 105 and an overlap of an edge of the second silicone membrane 105 has been placed over an adjacent edge of the first silicone membrane 104 to form a lap 106. The first silicone membrane 104 is then seamed to the second silicone membrane 105 at the lap 106 through the use of an adhesive 107. Additionally, the first silicone membrane 105 has been secured to the roof surface 102 through the use of a mechanical fastener 109 and the second silicone membrane 105 has been secured to the roof surface 102 through the use of an adhesive 108.

Definition of Terms

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

As used herein, the term "suitable substituent" is intended to mean a chemically acceptable functional group (i.e., a moiety that does not negate the activity of the disclosed compositions). Illustrative examples of suitable substituents include, but are not limited to, halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups and the like. Those skilled in the art will appreciate that many substituents can be substituted by additional substituents.

As used herein, the term "alkenyl" refers a straight or branched hydrocarbon chain containing from 2 to 10 carbons and containing at least one carbon-carbon double bond formed by the removal of two hydrogens. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, and 3-decenyl. Alkenyl groups may be unsubstituted or substituted by one or more suitable substituents, preferably 1 to 3 suitable substituents, as defined above.

As used herein, the term "alkoxy" refers to an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

As used herein, the term "alkyl" refers to a linear or branched hydrocarbon radical having the specified number of carbon atoms. The term "$C_1$-$C_6$-alkyl" is defined to include alkyl groups having 1, 2, 3, 4, 5, or 6 carbons in a linear or branched arrangement. For example, "$C_1$-$C_6$-alkyl" specifically includes methyl, ethyl, n-propyl, i-propyl, n-butyl, t-butyl, i-butyl, pentyl, and hexyl. Alkyl groups may be unsubstituted or substituted by one or more suitable substituents, preferably 1 to 3 suitable substituents, as defined above.

As used herein, the term "alkynyl" refers to a straight or branched hydrocarbon radical having 2, 3, 4, 5, 6, 7, 8, 9 or 10 carbons, and having one or more carbon-carbon triple bonds. Alkynyl groups include, but are not limited to, ethynyl, propynyl, and butynyl. Alkynyl groups may be unsubstituted or substituted by one or more suitable substituents, preferably 1 to 3 suitable substituents, as defined above.

As used herein, the term "amino" refers to an —$NH_2$ group.

As used herein, the term "aminoalkyl" refers to at least one amino group, as defined herein, appended to the parent molecular moiety through an alkyl group, as defined herein. Representative examples of aminoalkyl include, but are not limited to, aminomethyl, 2-aminoethyl, and 2-aminopropyl.

As used herein, the term "aryl" means monocyclic, bicyclic, or tricyclic aromatic radicals. Representative examples of the aryl groups include, but are not limited to, phenyl, dihydroindenyl, indenyl, naphthyl, dihydronaphthalenyl, and tetrahydronaphthalenyl. Aryl groups may be optionally substituted by one or more suitable substituents, preferably 1 to 5 suitable substituents, as defined above.

As used herein, the term "carbonyl" or "(C=O)" (as used in phrases such as alkylcarbonyl, alkyl —(C=O)— or alkoxycarbonyl) refers to the joinder of the >C=O moiety to a second moiety such as an alkyl or amino group (i.e. an amido group). Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

As used herein, the term "cycloalkyl" refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

As used herein, the term "halogen" or "halo" refers to a fluoro, chloro, bromo or iodo radical.

As used herein, the term "haloalkyl" refers to an alkyl group, as defined herein, substituted by one, two, three, or four halogen atoms. Representative examples of haloalkyl include, but are not limited to, chloromethyl, 2-fluoroethyl, trifluoromethyl, pentafluoroethyl, 2-chloro-3-fluoropentyl, and 4,4,4,-trifluorobutyl.

As used herein, the term "heteroaryl" refers to a monocyclic heteroaryl or a bicyclic heteroaryl. The monocyclic heteroaryl is a five- or six-membered ring. The five-membered ring contains two double bonds. The five-membered ring may contain one heteroatom selected from O or S; or one, two, three, or four nitrogen atoms and optionally one oxygen or sulfur atom. The six-membered ring contains three double bonds and one, two, three or four nitrogen atoms. Representative examples of monocyclic heteroaryl include, but are not limited to, furanyl, imidazolyl, isoxazolyl, isothiazolyl, oxadiazolyl, 1,3-oxazolyl, pyridinyl, pyridazinyl, pyrimidinyl, pyrazinyl, pyrazolyl, pyrrolyl, tetrazolyl, thiadiazolyl, 1,3-thiazolyl, thienyl, triazolyl, and triazinyl. The bicyclic heteroaryl includes a monocyclic heteroaryl fused to a phenyl, or a monocyclic heteroaryl fused to a monocyclic cycloalkyl, or a monocyclic heteroaryl fused to a monocyclic cycloalkenyl, or a monocyclic heteroaryl fused to a monocyclic heteroaryl, or a monocyclic heteroaryl fused to a monocyclic heterocycle. Representative examples of bicyclic heteroaryl groups include, but are not limited to, benzofuranyl, benzothienyl, benzoxazolyl, benzimidazolyl, benzoxadiazolyl, 6,7-dihydro-1,3-benzothiazolyl, imidazo[1,2-a]pyridinyl, indazolyl, indolyl, isoindolyl, isoquinolinyl, naphthyridinyl, pyridoimidazolyl, quinazolinyl, quinolinyl, thiazolo[5,4-b]pyridin-2-yl, thiazolo[5,4-d]pyrimidin-2-yl, and 5,6,7,8-tetrahydroquinolin-5-yl. Heteroaryl groups may be unsubstituted or substituted by one or more suitable substituents, preferably 1 to 5 suitable substituents, as defined above.

As used herein, the term "heterocycle" or "heterocyclyl" refers to a monocyclic heterocycle, a bicyclic heterocycle, or a tricyclic heterocycle. The monocyclic heterocycle is a three-, four-, five-, six-, seven-, or eight-membered ring containing at least one heteroatom independently selected from the group consisting of oxygen, nitrogen, phosphorus and sulfur. The three- or four-membered ring contains zero or one double bond, and one heteroatom selected from the group consisting of oxygen, nitrogen, phosphorus and sulfur. The five-membered ring contains zero or one double bond and one, two or three heteroatoms selected from the group consisting of oxygen, nitrogen, phosphorus and sulfur. The six-membered ring contains zero, one or two double bonds and one, two, or three heteroatoms selected from the group consisting of oxygen, nitrogen, phosphorus and sulfur. The seven- and eight-membered rings contains zero, one, two, or three double bonds and one, two, or three heteroatoms selected from the group consisting of oxygen, nitrogen, phosphorus and sulfur. Representative examples of monocyclic heterocycles include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, phosphinane, piperazinyl, piperidinyl, pyranyl, pyrazolinyl, pyrazolidinyl, pyrrolinyl, pyrrolidinyl, tetrahydrofuranyl, tetrahydropyranyl, tetrahydropyridinyl, tetrahydropyrimidinyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, or a monocyclic heterocycle fused to a monocyclic heterocycle, or a bridged monocyclic heterocycle ring system in which two non-adjacent atoms of the ring are linked by an alkylene bridge of 1, 2, 3, or 4 carbon atoms, or an alkenylene bridge of two, three, or four carbon atoms. Representative examples of bicyclic heterocycles include, but are not limited to, benzopyranyl, benzothiopyranyl, chromanyl, 2,3-dihydrobenzofuranyl, 2,3-dihydrobenzothienyl, azabicyclo[2.2.1]heptyl (including 2-azabicyclo[2.2.1]hept-2-yl), 2,3-dihydro-1H-indolyl, isoindolinyl, octahydrocyclopenta[c]pyrrolyl, octahydropyrrolopyridinyl, 9-phosphabicyclo[3.3.1]nonane, 8-phosphabicyclo[3.2.1]octane, and tetrahydroisoquinolinyl. Tricyclic heterocycles are exemplified by a bicyclic heterocycle fused to a phenyl group, or a bicyclic heterocycle fused to a monocyclic cycloalkyl, or a bicyclic heterocycle fused to a monocyclic cycloalkenyl, or a bicyclic heterocycle fused to a monocyclic heterocycle, or a bicyclic heterocycle in which two non-adjacent atoms of the bicyclic ring are linked by an alkylene bridge of 1, 2, 3, or 4 carbon atoms, or an alkenylene bridge of two, three, or four carbon atoms. Examples of tricyclic heterocycles include, but are not limited to, octahydro-2,5-epoxypentalene, hexahydro-2H-2,5-methanocyclopenta[b]furan, hexahydro-1H-1,4-methanocyclopenta[c]furan, aza-admantane (1-azatricyclo[3.3.1.1$^{3,7}$]decane), oxa-adamantane (2-oxatricyclo[3.3.1.1$^{3,7}$]decane), and 2,4,6-trioxa-8-phosphatricyclo[3.3.1.13,7] decane. Heterocyclic groups may be unsubstituted or substituted by one or more suitable substituents, preferably 1 to 3 suitable substituents, as defined above.

As used herein, the term "hydroxy" refers to an —OH group.

As used herein, the term "hydroxyalkyl" refers to an alkyl group, as defined herein, substituted by at least one hydroxy group. Representative examples of hydroxyalkyl include, but are not limited to, hydroxymethyl, 2-hydroxyethyl, 3-hydroxypropyl, 2,3-dihydroxypropyl, 2,3-dihydroxypentyl, 4-hydroxybutyl, 2-ethyl-4-hydroxyheptyl, 3,4-dihydroxybutyl, and 5-hydroxypentyl.

A prefix attached to a multi-component substituent only applies to the first component it precedes. To illustrate, the term "alkylcycloalkyl" contains two components: alkyl and cycloalkyl. Thus, the $C_1$-$C_6$-prefix on $C_1$-$C_6$-alkylcycloalkyl means that the alkyl component of the alkylcycloalkyl contains from 1 to 6 carbon atoms; the $C_1$-$C_6$-prefix does not describe the cycloalkyl component. To illustrate further, the prefix "halo" on haloalkoxyalkyl indicates that only the alkoxy component of the alkoxyalkyl substituent is substituted with one or more halogen radicals. If the halogen substitution may only occur on the alkyl component, the substituent would instead be described as "alkoxyhaloalkyl."

A substituent is "substitutable" if it comprises at least one carbon or nitrogen atom that is bonded to one or more hydrogen atoms. Thus, for example, hydrogen, halogen, and cyano do not fall within this definition. In addition, a sulfur atom in a heterocyclyl containing such atom is substitutable with one or two oxo substituents.

If a substituent is described as being "substituted", a non-hydrogen radical is in the place of hydrogen radical on a carbon or nitrogen of the substituent. Thus, for example, a substituted alkyl substituent is an alkyl substituent in which at least one non-hydrogen radical is in the place of a hydrogen radical on the alkyl substituent. To illustrate, monofluoroalkyl is alkyl substituted with a fluoro radical, and difluoroalkyl is alkyl substituted with two fluoro radicals. It should be recognized that if there is more than one substitution on a substituent, each non-hydrogen radical may be identical or different (unless otherwise stated).

When a substituent is referred to as "unsubstituted" or not referred to as "substituted" or "optionally substituted", it means that the substituent does not have any substituents. If a substituent is described as being "optionally substituted", the substituent may be either (1) not substituted or (2) substituted. If a substituent is described as being optionally substituted with up to a particular number of non-hydrogen radicals, that substituent may be either (1) not substituted; or (2) substituted by up to that particular number of non-hydrogen radicals or by up to the maximum number of substitutable positions on the substituent, whichever is less. Thus, for example, if a substituent is described as a heteroaryl optionally substituted with up to 3 non-hydrogen radicals, then any heteroaryl with less than 3 substitutable positions would be optionally substituted by up to only as many non-hydrogen radicals as the heteroaryl has substitutable positions. To illustrate, tetrazolyl (which has only one substitutable position) would be optionally substituted with up to one non-hydrogen radical. To illustrate further, if an amino nitrogen is described as being optionally substituted with up to 2 non-hydrogen radicals, then a primary amino nitrogen will be optionally substituted with up to 2 non-hydrogen radicals, whereas a secondary amino nitrogen will be optionally substituted with up to only 1 non-hydrogen radical.

If substituents are described as being "independently selected" from a group, each substituent is selected independent of the other. Each substituent, therefore, may be identical to or different from the other substituent(s).

EXAMPLES

Example 1

Preparation of a Silicone Membrane

A silicone membrane can be prepared using a hydrosilation curative agent. A composition of a silicone binder (e.g., Xiameter® RBG-091), a hydroxyl-terminated polydimethylsiloxane plasticizer A, a vinyl-terminated polydimethylsiloxane plasticizer B, fumed silica (e.g., Aerosil® R-972), and titanium dioxide (e.g., Ti Pure R-900) can be added to a Kneader style mixer and mixed for 30 minutes to 1 hr. The dynamic viscosity of the mixture can be greater than 1,000,000 cP. A hydrosilation curative, 8-50 ppm of Surfynol® 61 and 4-50 ppm of Karstedt's catalyst can be added to the mixture, and the mixture placed in a two-roll mill to produce a silicone membrane. The silicone membrane can be passed through a calendar roll system to press the membrane to a desired thickness. A reinforcing scrim can be added to the membrane, but a reinforcing scrim is not necessary. The membrane can be cured in an oven for 5-7 minutes at a temperature ranging from 100° C. to 120° C.

Example 2

Preparation of a Silicone Membrane

A silicone membrane can be prepared using a peroxide curative agent. A composition of a silicone binder (e.g., Xiameter® RBG-091), a hydroxyl-terminated polydimethylsiloxane plasticizer A, a vinyl-terminated polydimethylsiloxane plasticizer B, fumed silica (e.g., Aerosil® R-972), and titanium dioxide (e.g., Ti Pure R-900) can be added to a Kneader style mixer and mixed for 30 minutes to 1 hr. The dynamic viscosity of the mixture can be greater than 1,000,000 cP. A peroxide curative (e.g., UAROX® DCP-99 or LUPEROX®-DC), can be added to the mixture and placed in a two-roll mill to produce a silicone membrane. The silicone membrane can be passed through a calendar roll system to press the membrane to a desired thickness. A reinforcing scrim can be added to the membrane, but a reinforcing scrim is not necessary. The membrane can be cured in an oven for 5-7 minutes at a temperature ranging from 140° C. to 160° C.

What is claimed is:

1. A method for covering a roof, the method comprising:
   (i) providing first and second silicone membranes; where the first and second silicone membranes are prepared from curable compositions that include a gum-based silicone rubber, a hydroxyl-terminated or vinyl-terminated polysiloxane plasticizer, fumed silica, and a reflective pigment; and where the first and second silicone membranes are in the form of rolls;
   (ii) unrolling the first and second silicone membranes over a roof surface;
   (iii) positioning the first and second silicone membranes adjacent to one another and overlapping an edge of the second silicone membrane over an adjacent edge of the first silicone membrane to thereby form a lap;
   (iv) securing the first and second silicone membranes to the roof surface; and
   (v) seaming the first silicone membrane to the second silicone membrane in the lap.

2. The method of claim 1, where said step of securing includes mechanically fastening the first and second silicone membranes to the roof surface.

3. The method of claim 1, where said step of securing includes adhesively securing the first and second silicone membranes to the roof surface.

4. The method of claim 1, where said step of seaming the first silicone membrane to the second silicone membrane includes adhesively seaming the first and second silicone membranes.

5. The method of claim 1, where the first and second silicone membranes are characterized by tensile strength of 100 psi to 2,000 psi as measured according to ASTM D412.

6. The method of claim 5, where the first and second silicone membranes are characterized by elongation at break of 50% to 400% as measured according to ASTM D412.

7. The method of claim 6, where the first and second silicone membranes are characterized by a reflectivity of 13% or greater wherein the reflectivity is measured after 3 months of exterior exposure and where the reflectivity is measured using a spectrometer at 380 nanometers.

8. The method of claim 7, where the first and second silicone membranes are characterized by a reflectivity of 20% or greater wherein the reflectivity is measured after 3 months of exterior exposure and where the reflectivity is measured using a spectrometer at 380 nanometers.

9. The method of claim 1, where said step of unrolling includes unrolling the first and second silicone membranes over an insulation panel.

* * * * *